(12) United States Patent
Kawahara et al.

(10) Patent No.: US 10,599,347 B2
(45) Date of Patent: Mar. 24, 2020

(54) INFORMATION PROCESSING SYSTEM, INFORMATION PROCESSING APPARATUS, AND METHOD FOR CONTROLLING INFORMATION PROCESSING SYSTEM

(71) Applicant: FUJITSU LIMITED, Kawasaki-shi, Kanagawa (JP)

(72) Inventors: Jun Kawahara, Kawasaki (JP); Masanori Higeta, Setagaya (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 16/003,164

(22) Filed: Jun. 8, 2018

(65) Prior Publication Data
US 2019/0012102 A1 Jan. 10, 2019

(30) Foreign Application Priority Data
Jul. 4, 2017 (JP) ................................. 2017-131270

(51) Int. Cl.
*G06F 3/06* (2006.01)
*G06F 15/173* (2006.01)

(52) U.S. Cl.
CPC .......... *G06F 3/0622* (2013.01); *G06F 3/0659* (2013.01); *G06F 3/0673* (2013.01); *G06F 15/17306* (2013.01); *G06F 15/17375* (2013.01)

(58) Field of Classification Search
CPC ................................................ G06F 15/17375
See application file for complete search history.

(56) References Cited

U.S. PATENT DOCUMENTS

| | | | | |
|---|---|---|---|---|
| 5,155,858 A | * | 10/1992 | DeBruler | G06F 9/505 712/30 |
| 7,206,922 B1 | * | 4/2007 | Steiss | G06F 9/3802 711/151 |
| 2011/0149974 A1 | | 6/2011 | Sakamoto et al. | |

FOREIGN PATENT DOCUMENTS

JP 2011-128989 6/2011

* cited by examiner

*Primary Examiner* — Farley Abad
(74) *Attorney, Agent, or Firm* — Fujitsu Patent Center (57) ABSTRACT

An information processing system includes: a processor in one information processing apparatus among information processing apparatuses coupled via a ring bus corresponding to a closed-loop bus; and a first memory, wherein the processor: generate a verification request for verification of completion of a write request after issuing the write request to a second memory in the information processing apparatuses; transmit the verification request to a subsequent information processing apparatus; transmit, when a request from a preceding information processing apparatus is not a verification request, the request to the subsequent information processing apparatus; transmit, when the request is a verification request to another information processing apparatus, the verification request and a request to the first memory to the subsequent information processing apparatus in order of receiving; and execute, when the request is a verification request to the one information processing apparatus, processing and generate a response of completion of the processing.

15 Claims, 10 Drawing Sheets

INFORMATION PROCESSING SYSTEM, INFORMATION PROCESSING APPARATUS, AND METHOD FOR CONTROLLING INFORMATION PROCESSING SYSTEM

CROSS-REFERENCE TO RELATED APPLICATION

This application is based upon and claims the benefit of priority of the prior Japanese Patent Application No. 2017-131270, filed on Jul. 4, 2017, the entire contents of which are incorporated herein by reference.

FIELD

The embodiments discussed herein are related to an information processing system, an information processing apparatus, and a method for controlling an information processing system.

BACKGROUND

In an information processing system including a plurality of information processing apparatuses, a request (write request) to write to a memory is issued.

Related techniques are disclosed in, for example, Japanese Laid-open Patent Publication No. 2011-128989.

SUMMARY

According to an aspect of the invention, an information processing system includes: a processor disposed in one information processing apparatus among a plurality of information processing apparatuses coupled with each other via a ring bus corresponding to a closed-loop bus; and a first memory, wherein the processor: generate a verification request that is used for verification of completion of a write request after issuing the write request to a second memory included in the plurality of information processing apparatuses; transmit the verification request to a subsequent information processing apparatus included in the plurality of information processing apparatuses and subsequent to the one information processing apparatus; transmit, when a request from a preceding information processing apparatus included in the plurality of information processing apparatuses and preceding the one information processing apparatus is not a verification request, the request to the subsequent information processing apparatus; transmit, when the request is a verification request to another information processing apparatus included in the plurality of information processing apparatuses, the verification request and a request to the first memory to the subsequent information processing apparatus in order of receiving; and execute, when the request is a verification request to the one information processing apparatus, processing in accordance with the verification request and generate a response of completion of the processing.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 7:
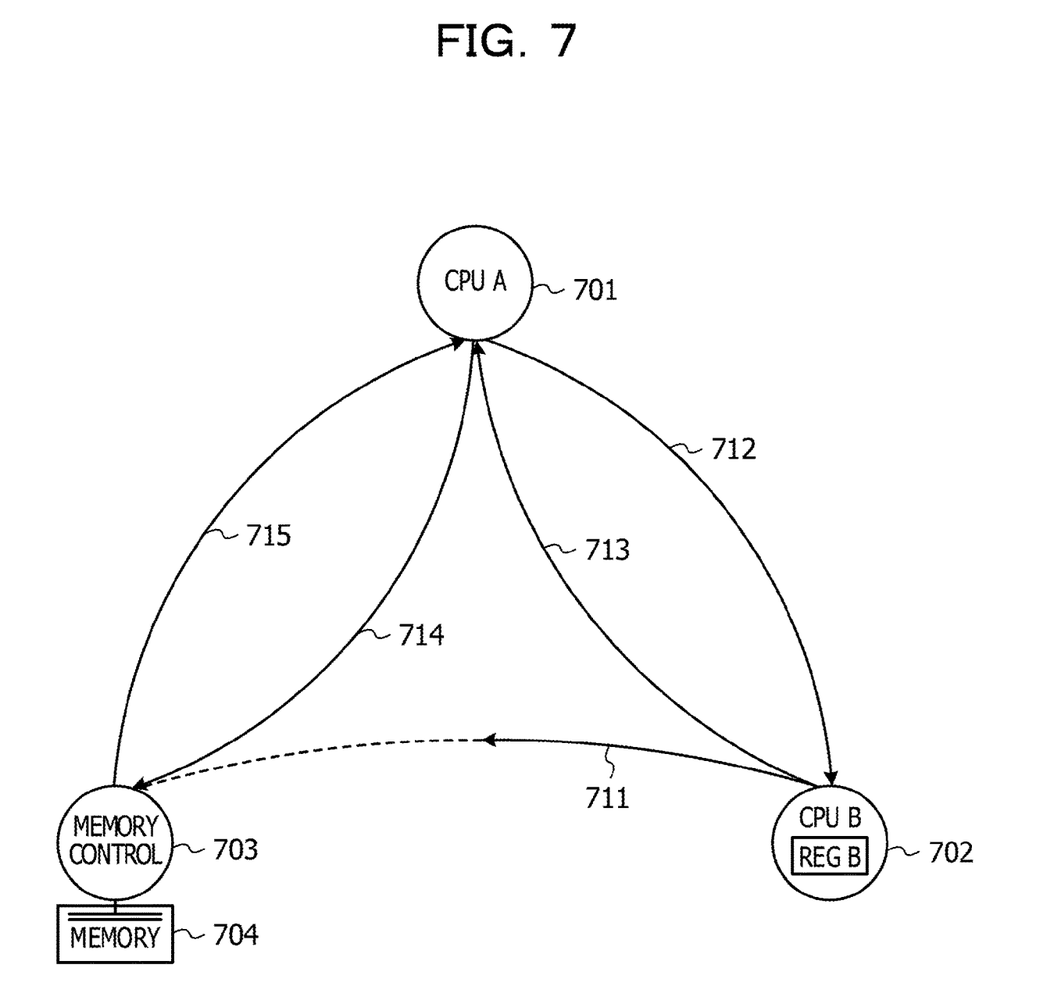
FIG. 7 illustrates an example of processing in the case where it is not ensured that a write request to write to a memory is complete.

For example, in an information processing system including a plurality of information processing apparatuses, in the case where it is not ensured that a request (write request) to write to a memory is complete, as illustrated in FIG. 7, access of data before the data is updated by the write request could occur. FIG. 7 illustrates the case where a central processing unit (CPU) A701 reads data in a memory 704 that has been written by a CPU B702.

The CPU B702 issues, to a memory controller 703, a write request to write to the memory 704 (711), and the CPU B702 writes "memory updated" to its register (REG B). Then, the CPU A701 issues, to the CPU B702, a read request to read the register (REG B) of the CPU B702 (712). Having received the read request, the CPU B702, upon completion of reading, returns, to the CPU A701, the content "memory updated" of the register (REG B) as the read data (713).

Having received the response "memory updated" from the CPU B702, the CPU A701 determines that data in the memory 704 has already been updated, and issues, to the memory controller 703, a read request to read the memory 704 (714). For example, the read request (714) from the CPU A701 arrives at the memory controller 703 before the write request (711) from the CPU B702 does.

In this case, although, upon completion of reading, the memory controller 703 returns the read data to the CPU A701 (715), the write request from the CPU B702 has not reached the memory controller 703, and therefore data in the memory 704 is not updated. This results in that, upon completion of reading, data that has not been updated in the memory 704 is returned to the CPU A701, such that the CPU A701 is unable to read updated data, which is to be written to the memory 704 by the CPU B702.

If, in such a way, it is not ensured that a write request to write to a memory is complete, access of data before the data is updated might occur, causing a problem of data integrity. To ensure that a write request to write to a memory is complete, it is sufficient that, for example, completion of memory write processing be verified. For example, in an information processing system illustrated in FIG. 8, a method for verifying completion of memory write processing may be provided.

Figure 8:
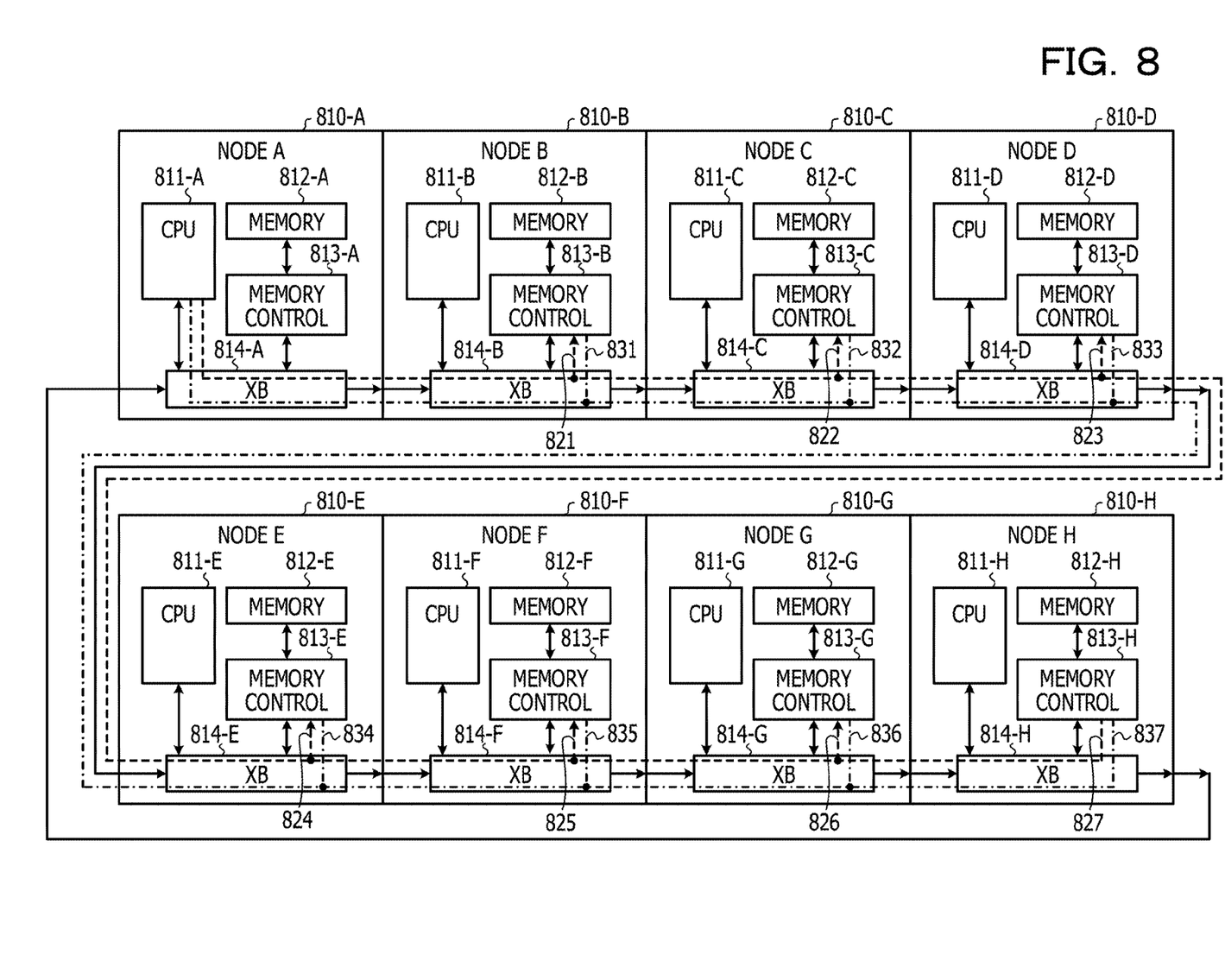
FIG. 8 illustrates an example of an information processing system to which a ring bus is applied.

FIG. 8 illustrates an information processing system in which a plurality of nodes (information processing apparatuses) 810 are coupled via a ring bus that couples a plurality of nodes in a closed-loop arrangement. Each node 810 includes a CPU 811, a memory 812, a memory controller 813, and a crossbar (XB) unit 814. The CPU 811 performs arithmetic processing and issues a request. The memory controller 813 writes data (performs data writing) and reads data (performs data reading) to and from the memory 812 in accordance with a received request. The crossbar unit (XB) 814 determines the destination of a packet of a request or the like transmitted via the ring bus and controls transmission of the packet.

In the information processing system illustrated in FIG. 8, the CPU 811 in each node 810 passes through the crossbar unit (XB) 814 when accessing the memory 812 of this node or the CPU 811 or the memory 812 of another node. The crossbar units (XB) 814 are coupled together in a ring, and a request issued from some node 810 propagates only in one direction. For example, the request propagates in the direction of nodes A, B, C, D, E, F, G, H, A, . . . . Accordingly, in the case of issuing a request, for example, from the node A 810-A to the node H 810-H, a request issued from the node A 810-A passes through all of the crossbar units (XB) 814-A to 814-H of nodes A, B, C, D, E, F, G, and H to arrive at the node H 810-H. Requests issued from the same source are transferred in the order in which the requests were issued.

Figure 9:
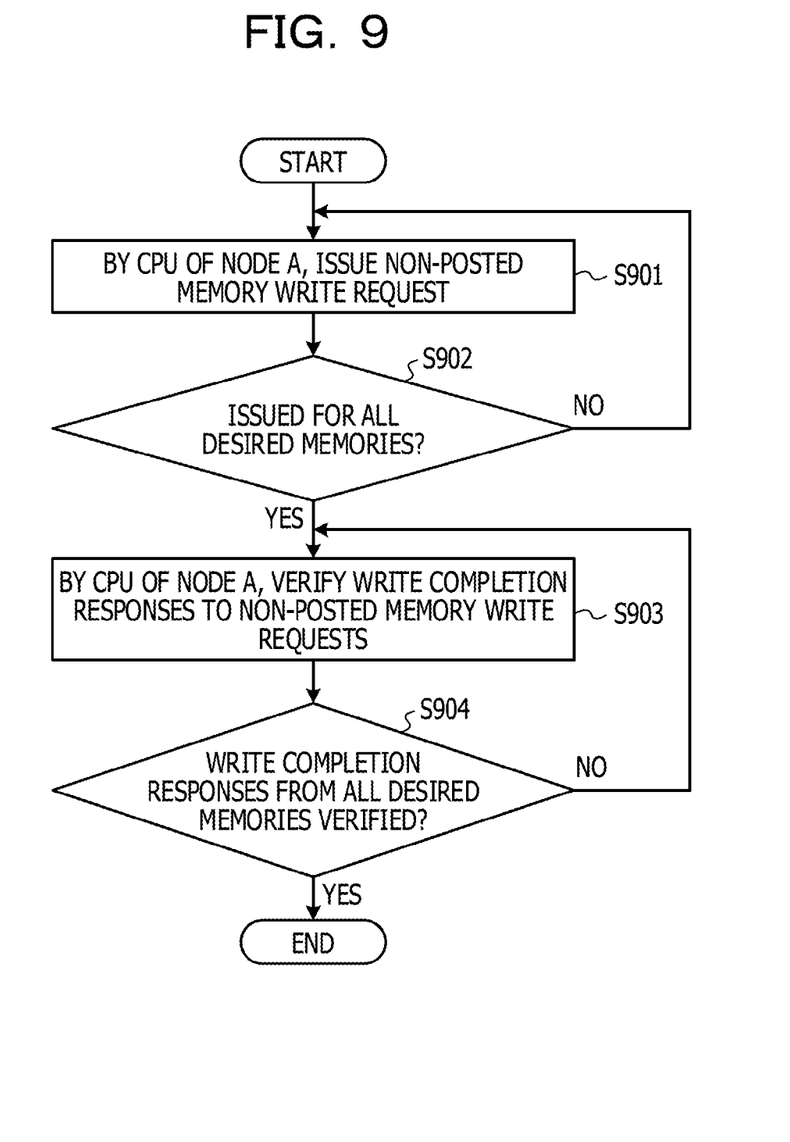
FIG. 9 illustrates an example of memory write operations in an information processing system.

For example, operations executed when the CPU 811-A of node A issues requests (write requests) to write data to the memories 812-B to 812-H of nodes B to H and verifies completion of memory write processing are illustrated in FIG. 9. In step S901, the CPU 811-A of node A issues a non-posted memory write request to a memory to which data is to be written.

Step S901 is repeated until, in step S902, the CPU 811-A of node A determines that the CPU 811-A of node A has issued the requests to all of the memories to which data is to be written. For example, the CPU 811-A of node A issues seven non-posted memory write requests 821 to 827 to the memories 812-B to 812-H of nodes B to H. The non-posted memory write request is a request for which the memory controller 813 that has received the request returns a write completion response to the source from which the request has been issued.

In step S903, the CPU 811-A of node A verifies write completion responses to the issued non-posted memory write requests. The CPU 811-A of node A keeps waiting for write completion responses, and if, in step S904, it is determined that write completion responses from all of the target memories (seven write completion responses 831 to 837 in this case) have been verified, the CPU 811-A verifies that memory write processing of memory write requests issued by the CPU 811-A is complete, and the process then ends.

For example, in a system in which a plurality of modules are coupled by a ring bus, the order of requests is guaranteed by making use of the longest time for some request to travel around the ring bus.

In the foregoing method for verifying completion of memory write processing, in order to verify completion of memory write processing, the source from which memory write requests have been issued is to await write completion responses from all of the units to which the memory write requests have been issued. The number of write completion responses increases with an increasing number of nodes, and these write completion responses return to the same destination (the source from which requests have been issued), occupying the transmission path to the source. For example, the larger the system, the longer the time taken to verify completion of memory write processing, which might hinder the transmission of other requests and the like. For example, an information processing system may be provided that rapidly ensures that memory write requests are complete and that includes a plurality of information processing apparatuses coupled via a ring bus that is a closed-loop bus.

Figure 1:
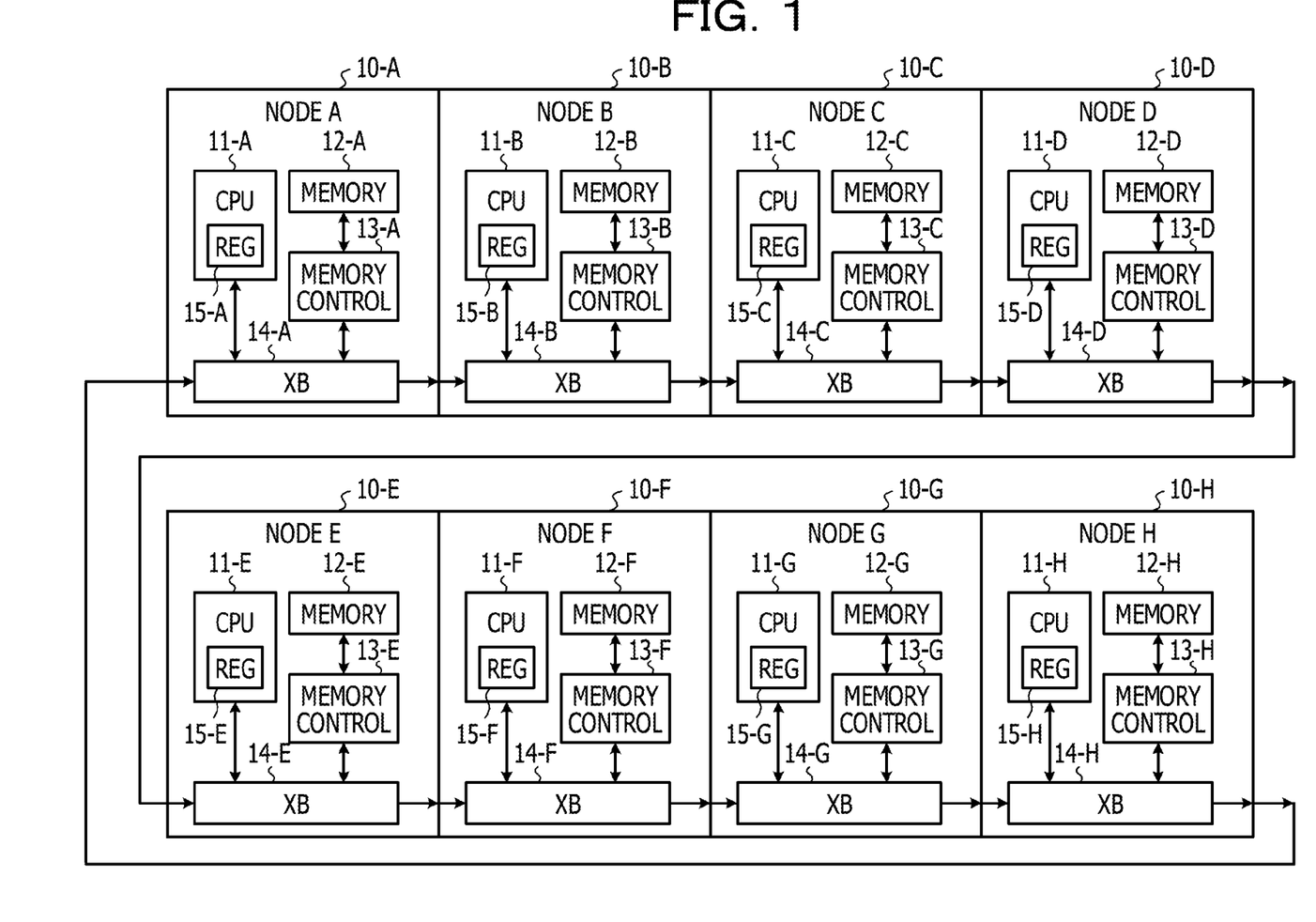
FIG. 1 illustrates an example of an information processing system.

FIG. 1 illustrates an example of an information processing system. The information processing system includes nodes 10 as a plurality of information processing apparatuses coupled via a ring bus, which couples a plurality of nodes in a closed-loop arrangement. FIG. 1 illustrates a configuration in which eight nodes 10-A to 10-H are coupled via a ring bus; however, the configuration is not limited to this and the number of nodes coupled via the ring bus is any number more than one.

Each node 10 includes a CPU 11, a memory 12, a memory controller 13, and a crossbar unit (XB) 14. Note that, in FIG. 1, the CPU 11, the memory 12, the memory controller 13, and the crossbar unit (XB) 14 are illustrated as functional units included in each node 10 for the sake of convenience; however, other functional units may be included.

The CPU 11 performs arithmetic processing and issues a request. The CPU 11 includes a verification register 15 used to verify completion of memory write processing in accordance with a memory write request issued by the CPU 11 itself. The memory controller 13 writes data (performs data writing) and reads data (performs data reading) to and from the memory 12 in accordance with a received request. The crossbar unit (XB) 14 determines the destination of a packet of a request or the like to be transmitted via the ring bus and controls transmission of the packet.

In the information processing system, the CPU 11 in each node 10 passes through the crossbar unit (XB) 14 when accessing the memory 12 of this node or the CPU 11 or the memory 12 of another node. In addition, the crossbar units (XB) 14 are coupled together in a ring arrangement, and a request issued from some node 10 propagates in a single direction (only in one direction). For example, the request is assumed to propagate in the direction of nodes A, B, C, D, E, F, G, H, A, . . . but may propagate in a direction opposite to this direction. In addition, requests issued by the same source are transferred in the order in which the requests were issued, and overtaking of requests will not occur inside the system.

The CPU 11 is able to issue a request to the verification register 15 of this node in addition to a request to the memory 12 of this node and requests to the CPU 11 and the memory 12 of another node. The request to the verification register 15 travels around the ring bus without being ahead of a preceding request to a memory issued by the CPU 11 itself, and returns to this node. After issuing one or more memory write requests, the CPU 11 issues one request to the verification register 15, and verifies completion of memory write processing of the memory write requests issued by this CPU 11 itself by using a response of completion of access to the verification register 15 in accordance with the request to the verification register 15 that has traveled around the ring bus.

Figure 2:
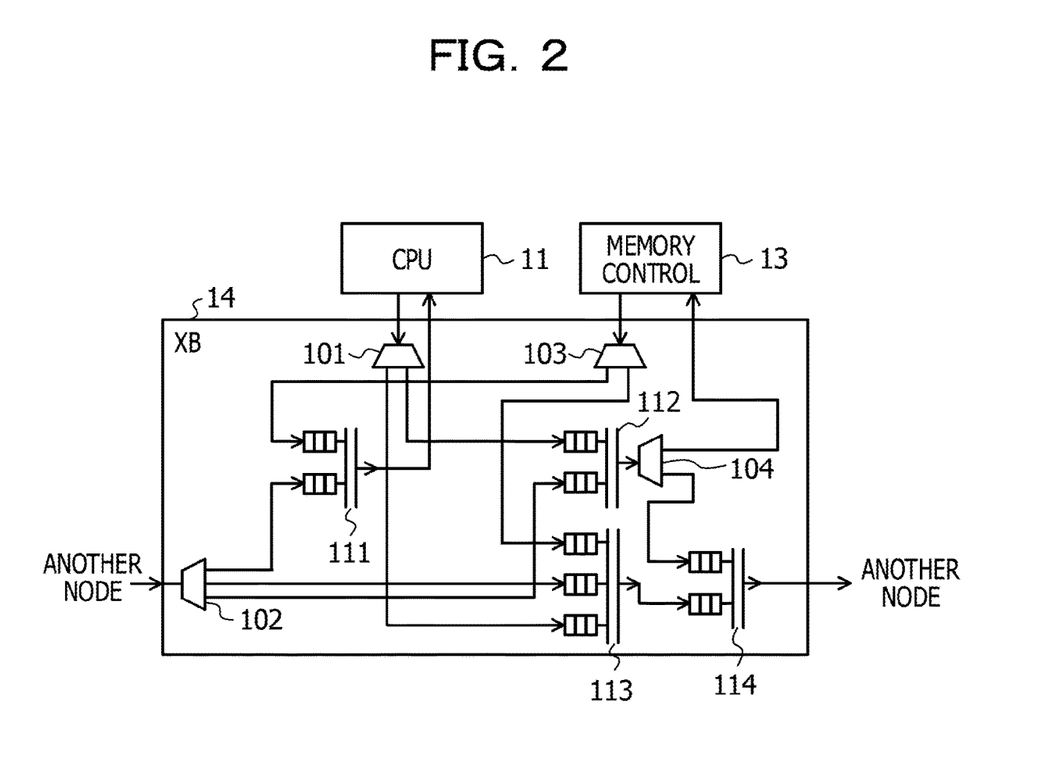
FIG. 2 illustrates an example of a crossbar unit.

FIG. 2 illustrates an example of a configuration of the crossbar unit (XB) 14. The crossbar unit (XB) 14 includes four transfer units 101, 102, 103, and 104 and four arbitrating units 111, 112, 113, and 114. The transfer units 101 to 104 each transfer a packet of a request or the like, based on destination (to which the packet has been issued) information in the packet. The transfer units 101 to 104 each transfer a single packet to a single transfer destination but will not transfer the packet to a plurality of transfer destinations. The arbitrating units 111 to 114 arbitrate between packets to deliver the packets to the determined delivery destinations. The arbitrating units 111 to 114 output packets according to the order in which the packets are stored in their buffers (queues).

The first transfer unit 101 is a circuit for transferring a packet from the CPU 11 of this node to the memory controller 13 of this node or to another node that is subsequent (next) to the node. The first transfer unit 101 transfers a packet to the second arbitrating unit 112 when the packet destination is the memory controller 13 of this node or the verification register 15 of this node, and the first transfer unit 101 transfers a packet to the third arbitrating unit 113 when the destination of the packet is another node.

The second transfer unit 102 is a circuit for transferring a packet from another node that precedes (immediately precedes) this node to any one of the CPU 11 of this node, the memory controller 13 of this node, and another node that is subsequent to this node. The second transfer unit 102 transfers a packet to the first arbitrating unit 111 when the destination of the packet is the CPU 11 of this node or the verification register 15 of this node, the second transfer unit 102 transfers a packet to the second arbitrating unit 112 when the destination of the packet is the memory controller 13 of this node or the verification register 15 of another node, and the second transfer unit 102 transfers a packet to the third arbitrating unit 113 when the destination of the packet is another node.

The third transfer unit 103 is a circuit for transferring a packet from the memory controller 13 of this node to the CPU 11 of this node or another node that is subsequent to this node. The third transfer unit 103 transfers a packet to the first arbitrating unit 111 when the destination of the packet is the CPU 11 of this node, and the third transfer unit 103 transfers a packet to the third arbitrating unit 113 when the destination of the packet is another node.

The fourth transfer unit 104 is a circuit for transferring a packet from the second arbitrating unit 112 to the memory controller 13 of this node or another node that is subsequent to this node. The fourth transfer unit 104 transfers a packet to the memory controller 13 of this node when the destination of the packet is the memory controller 13 of this node, and the fourth transfer unit 104 transfers a packet to the fourth arbitrating unit 114 when the destination of the packet is the verification register 15 of this node or is another node.

The first arbitrating unit 111 arbitrates between a packet from the memory controller 13 of this node and a packet from another node that precedes this node, these packets being stored in a buffer (queue) of the first arbitrating unit 111 itself, and thus the first arbitrating unit 11 delivers the packets to the CPU 11 of this node. The second arbitrating unit 112 arbitrates between a packet from the CPU 11 of this node and a packet from another node that precedes this node, these packets being stored in a buffer (queue) of the second arbitrating unit 112 itself, and thus the second arbitrating unit 112 delivers the packets to the fourth transfer unit 104.

The third arbitrating unit 113 arbitrates among a packet from the CPU 11 of this node, a packet from the memory controller 13 of the node, and a packet from another node that precedes the node, these packets being stored in a buffer (queue) of the third arbitrating unit 113 itself, and thus the third arbitrating unit 113 delivers the packets to the fourth arbitrating unit 114. The fourth arbitrating unit 114 arbitrates between a packet from the fourth transfer unit 114 and a packet from the third arbitrating unit 113, these packets being stored in a buffer (queue) of the fourth arbitrating unit 114 itself, and thus the fourth arbitrating unit 114 delivers the packets to another node that is subsequent to the node.

Figure 3A:
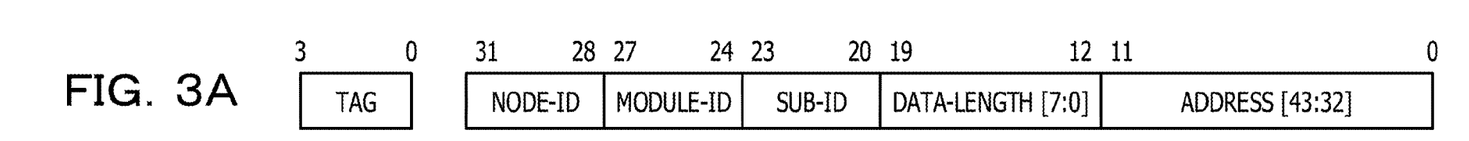
FIGS. 3A to 3D illustrate examples of packets.
Figure 3B:
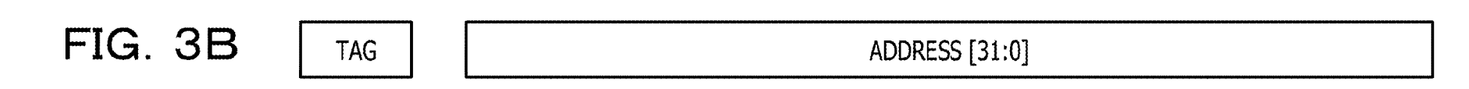
Figure 3C:
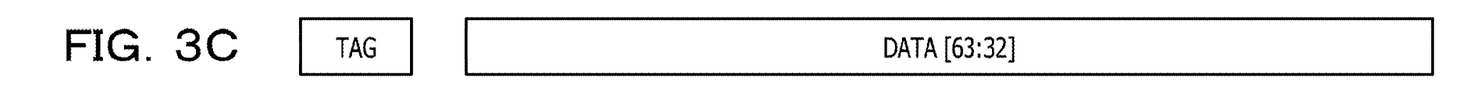
Figure 3D:
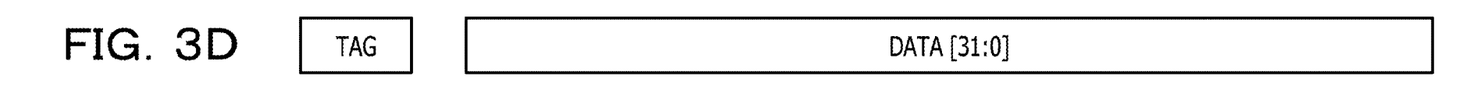

FIGS. 3A to 3D illustrate examples of packets that are transmitted. Data illustrated in FIG. 3A is transmitted in a first cycle and data illustrated in FIG. 3B is transmitted in a second cycle. In addition, data illustrated in FIG. 3C is transmitted in the first cycle and data illustrated in FIG. 3D is transmitted in the second cycle.

In a tag field, information indicating a packet type is stored. Information in the tag field enables it to be determined whether the header is a write packet header or a read packet header and what number of cycle the information is transmitted in. In a node-ID field, information indicating a node that is the destination of the packet is stored. In a module-ID field, information indicating whether the destination of the packet is a CPU, a memory controller, or a crossbar unit in the node is stored, and in a sub-ID field, information indicating whether the destination of the packet is a verification register or not is stored.

The transfer units 101 to 104 of the crossbar unit (XB) 14 determine, by using, for example, information in the tag field, that a write packet in the first cycle is provided, determine the destination of the packet from information in the node-ID field, the module-ID field, and the sub-ID field, and transfer the packet. In the data length field, information indicating a data length is stored. In the address field, information indicating the address of the access destination is stored, and, in the data field, data related to access is stored.

Figure 4:
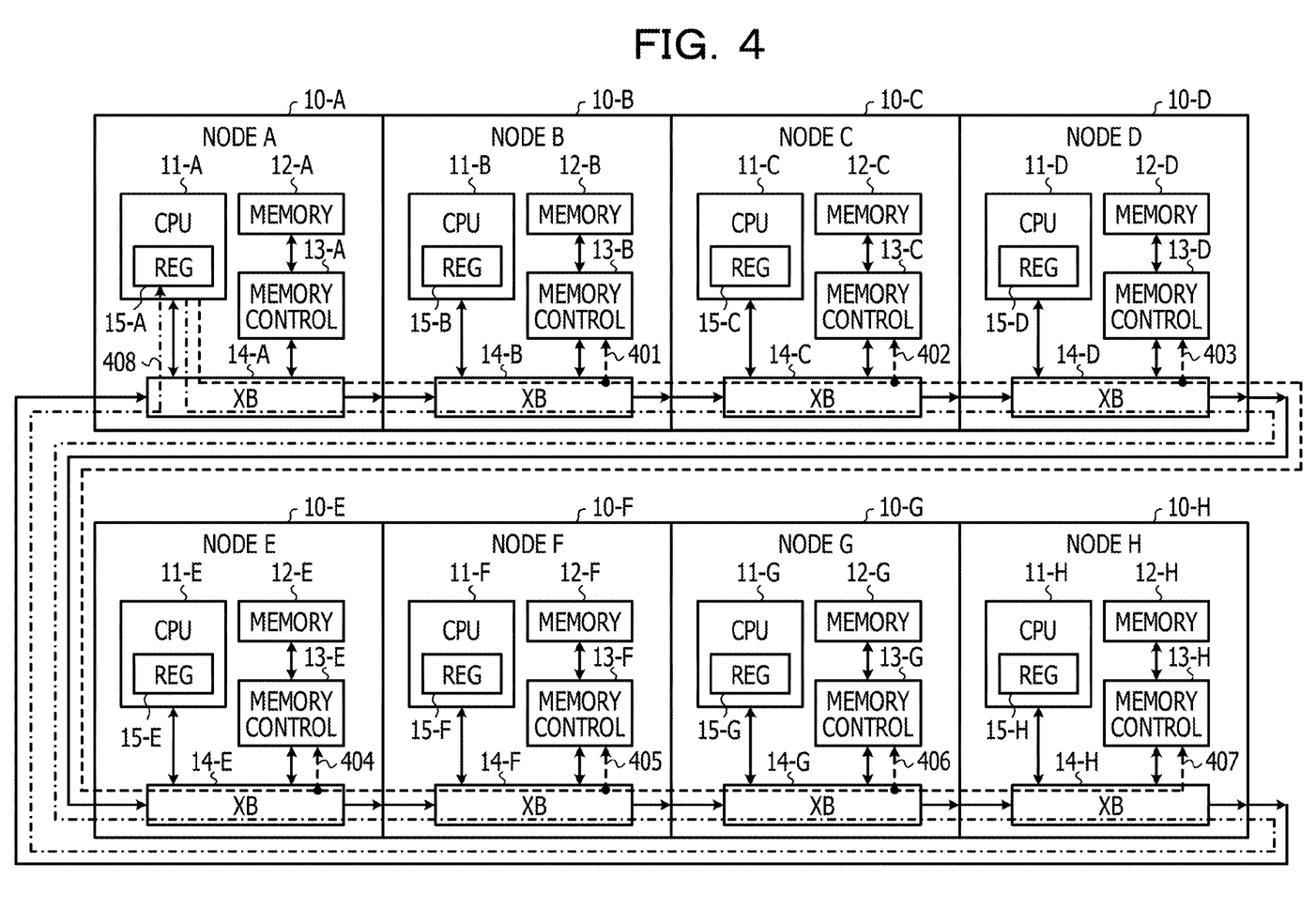
FIG. 4 illustrates an example of a method for verifying completion of memory write processing.
Figure 5:
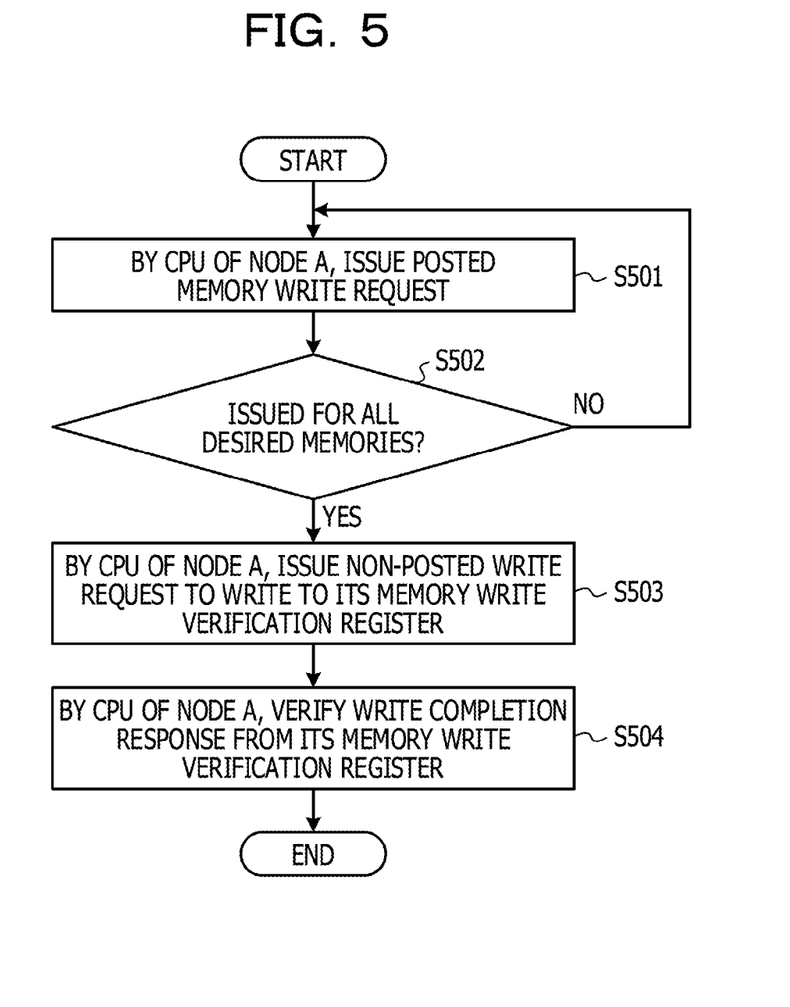
FIG. 5 illustrates an example of memory write operations.

Hereinafter, as illustrated in FIG. 4, operations of the case where a CPU 11-A of node A issues a request (write request) to write data to the memories 12-B to 12-H of nodes B to H and verifies completion of the memory write processing will be described by way of example. FIG. 5 illustrates an example of memory write operations in the information processing system.

In step S501, the CPU 11-A of node A issues a posted memory write request to a memory to which data is to be written. The processing of step S501 is repeated until, in step S502, the CPU 11-A of node A determines that requests have been issued for all of the memories to which data is to be written.

For example, seven posted memory write requests (401 to 407 illustrated in FIG. 4) to write to the memories 12-B to 12-H of nodes B to H are issued. Note that the posted memory write request is a request for which the memory controller 13 that has received the request does not return a write completion response to the source from which the request has been issued.

After issuing memory write requests to all of the target memories, in step S503, the CPU 11-A of node A issues a non-posted register write request to its verification register 15. This register write request, which makes a request to access a register in node A, is issued to the outside of node A.

A register write request to the verification register 15 issued from the CPU 11-A of node A travels around the ring bus by passing through the second arbitrating unit 112, which arbitrates between packets (requests) addressed to the memory controller 13, in the crossbar unit (XB) 14 of each of the nodes B to H, and then the register write request returns to the CPU 11-A of node A. Write access to the verification register 15 is performed in accordance with the register write request that has traveled around the ring bus and has returned to the CPU 11-A of node A, and, in step S504, upon verifying a write completion response from the verification register 15, the CPU 11-A of node A completes the operations.

For example, since requests issued from the same source are transferred in order, and overtaking of requests will not occur inside the system, when a register write request to write to the verification register 15 travels around the ring bus and arrives at the original node (node A in this example), all of the memory write requests issued before this register write request have been complete. Accordingly, the CPU 11-A of node A is able to verify completion of memory write processing of memory write requests issued by the CPU 11-A itself by verifying a write completion response for a non-posted register write request to write to the verification register 15, which may rapidly ensure that memory write requests are complete. With light traffic, it may be achieved to rapidly ensure that memory write requests are complete. This may reduce the traffic of transmission paths and may improve the performance of the information processing system.

Figure 6A:
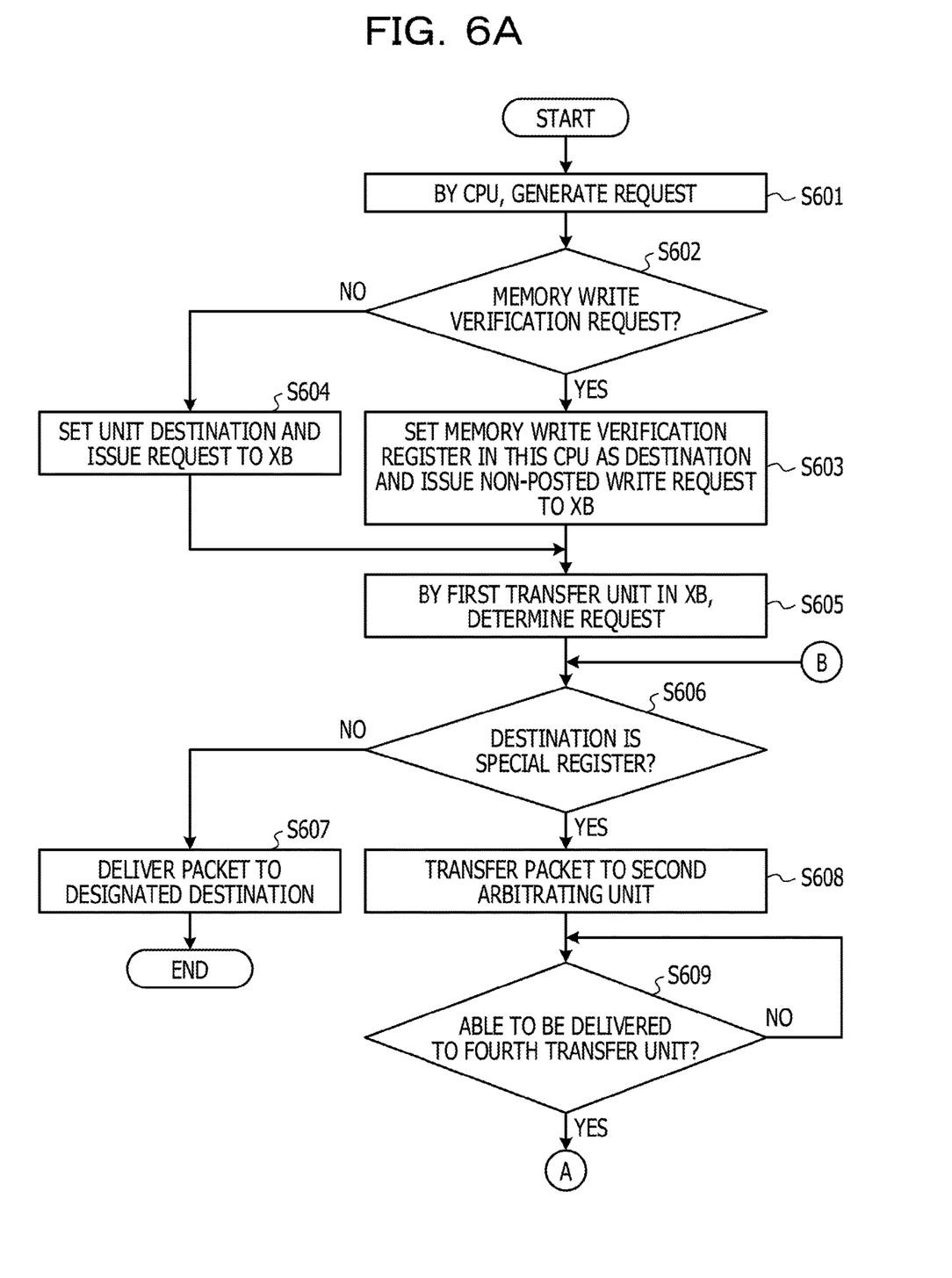
FIGS. 6A and 6B illustrate an example of operations of an information processing system.
Figure 6B:
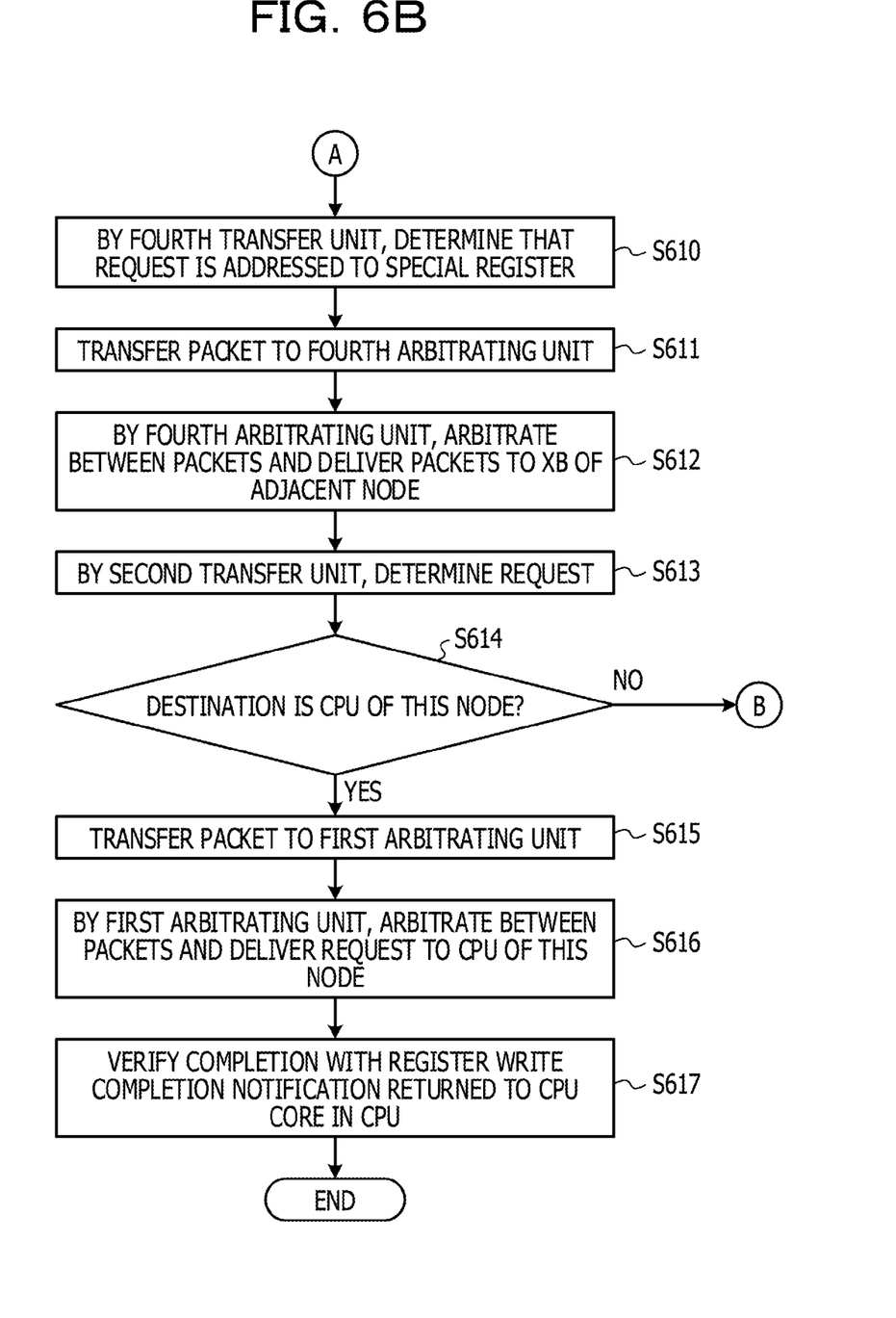

With reference to FIGS. 6A and 6B, operations of the crossbar unit (XB) 14 and the like in the information processing system will be described. In step S601, the CPU 11 of some node is to generate a request. At this point, this CPU 11 determines, in step S602, whether the request to be generated is a request for verifying completion of the memory write access of a request that was issued in the past by the CPU 11 itself.

If the determination result is that the request to be generated is a request for verifying completion of the memory write access, in step S603, the CPU 11 generates a non-posted register write request in which the verification register 15 in this CPU 11 is set as the destination, and issues the generated non-posted register write request to the crossbar unit (XB) 14 of this node. If the request to be generated is not a request for verifying completion of the memory write access, in step S604, the CPU 11 generates a request whose destination is a unit to which the request is to be issued, and issues the request to the crossbar unit (XB) 14 of this node.

In step S605, the first transfer unit 101 in the crossbar unit (XB) 14 of this node determines the destination of the packet (request) issued by the CPU 11 of this node. At this point, the first transfer unit 101 in the crossbar unit (XB) 14 determines, in step S606, whether the destination of the packet is the verification register 15 of this node.

If the determination result in step S606 is that the packet destination is not the verification register 15 of this node, in step S607, the crossbar unit (XB) 14 of each node is controlled so that a packet is delivered to the designated destination, and thus the packet is delivered to the designated destination. Otherwise, if it is determined that the packet destination is the verification register 15 of this node, in step S608, the first transfer unit 101 in the crossbar unit (XB) 14 transfers the packet to the second arbitrating unit 112.

In step S609, the second arbitrating unit 112 in the crossbar unit (XB) 14 determines whether the packet transferred in step S608 is able to be delivered to the fourth transfer unit 104. As a result, the processing of step S609 continues until it is determined that the packet is able to be delivered to the fourth transfer unit 104, and if it is determined that the packet is able to be delivered to the fourth transfer unit 104, the packet is delivered to the fourth transfer unit 104.

If, in step S610, the fourth transfer unit 104 determines that the destination of a packet (request) is the verification register 15, in step S611, the fourth transfer unit 104 transfers the packet to the fourth arbitrating unit 114. In step S612, the fourth arbitrating unit 114 arbitrates between packets and delivers the packets to the crossbar unit (XB) 14 of the subsequent (next) node.

The second transfer unit 102 that has received a packet (request) from another node that precedes (immediately precedes) this node determines, in step S613, whether the destination of the request is this node. As a result, if the destination is not this node (No in S614), the process returns to step S606, and repeats the processing described above.

Otherwise, if the determination result in step S614 is that the destination of the request is this node, for example, if the request has traveled around the ring bus and has returned to this node, the process proceeds to step S615, where the second transfer unit 102 transfers the packet to the first arbitrating unit 111 of this node. In this node, in step S616, the first arbitrating unit 111 arbitrates between packets and delivers the request to the CPU 11 of this node. Then, a response of completion of write access to the verification register 15 is returned to the CPU 11 of this node, and thus the CPU 11 of this node is able to verify completion of the memory write access processing.

In the example described above, by using a response of completion of a register write request to write to the verification register 15 included in the CPU 11, completion of memory access processing the requests for which have been issued ahead of the register write request is verified. However, the present disclosure is not limited to this and it is sufficient that a completion response from the verification register 15 be provided, and therefore a non-posted register read request to read the verification register 15 may be issued and, by using its completion response, completion of memory access processing may be verified. Similar effects may be obtained by, instead of using completion of access to the verification register 15, issuing a request to access a memory for verifying a notification of a completion response after issuing a memory write request to write data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
  a processor disposed in one information processing apparatus among a plurality of information processing apparatuses coupled with each other via a ring bus corresponding to a closed-loop bus;
  and a first memory included in the one information processing apparatuses,
  the processor:
    generate a verification request that is used for verification of completion of a write request after issuing the write request to a second memory included in each of one or more information processing apparatuses which are included in the plurality of information processing apparatuses and are other than the one information processing apparatus;
    transmit the verification request to a subsequent information processing apparatus included in the plurality of information processing apparatuses and subsequent to the one information processing apparatus;
    transmit, when a request from a preceding information processing apparatus included in the plurality of information processing apparatuses and preceding the one information processing apparatus is not a verification request, the request to the subsequent information processing apparatus;

transmit, when the request is a verification request to another information processing apparatus included in the plurality of information processing apparatuses, the verification request and a request to the first memory to the subsequent information processing apparatus in order of receiving; and execute, when the request is a verification request to the one information processing apparatus, processing in accordance with the verification request and generate a response of completion of the processing.

2. The information processing system according to claim 1, wherein the one information processing apparatus includes an arbitrating circuit that arbitrates between the verification request and the request to the first memory and output the verification request and the request in order of receiving, and the processor: transfers, when a request output from the arbitrating circuit is the verification request, the request output from the arbitrating circuit to the subsequent information processing apparatus; transfer, when the request received from the preceding information processing apparatus is the verification request to the another information processing apparatus or the request to the first memory, the request received from the previous information processing apparatus to the arbitrating circuit; and execute, when the request received from the preceding information processing apparatus is the verification request to the one information processing apparatus, processing in accordance with the verification request.

3. The information processing system according to claim 1, wherein the verification request to the one information processing apparatus is an access request to a register included in the one information processing apparatus.

4. The information processing system according to claim 1, wherein the verification request to the one information processing apparatus is an access request to the first memory.

5. The information processing system according to claim 1, wherein the write request to the second memory included in each of the one or more information processing apparatuses is a request without a completion response.

6. The method according to claim 1, wherein the write request to the second memory included in each of the one or more information processing apparatuses is a request without a completion response.

7. An information processing apparatus comprising:
a processor disposed in the information processing apparatus among a plurality of information processing apparatuses coupled with each other via a ring bus corresponding to a closed-loop bus; and
a first memory included in the information processing apparatus,
the processor:
generate a verification request that is used for verification of completion of a write request after issuing the write request to a second memory included in each of one or more information processing apparatuses which are included in the plurality of information processing apparatuses and are other than the information processing apparatus;
transmit the verification request to a subsequent information processing apparatus included in the plurality of information processing apparatuses and subsequent to the information processing apparatus;
transmit, when a request from a preceding information processing apparatus included in the plurality of information processing apparatuses and preceding the information processing apparatus is not a verification request, the request to the subsequent information processing apparatus;

transmit, when the request is a verification request to another information processing apparatus included in the plurality of information processing apparatuses, the verification request and a request to the first memory to the subsequent information processing apparatus in order of receiving; and execute, when the request is a verification request to the information processing apparatus, processing in accordance with the verification request and generate a response of completion of the processing.

8. The information processing apparatus according to claim 7, further comprising
an arbitrating circuit that arbitrates between the verification request and the request to the first memory and output the verification request and the request in order of receiving, and
wherein the processor: transfers, when a request output from the arbitrating circuit is the verification request, the request output from the arbitrating circuit to the subsequent information processing apparatus; transfer, when the request received from the preceding information processing apparatus is the verification request to the another information processing apparatus or the request to the first memory, the request received from the previous information processing apparatus to the arbitrating circuit; and execute, when the request received from the preceding information processing apparatus is the verification request to the one information processing apparatus, processing in accordance with the verification request.

9. The information processing apparatus according to claim 7, wherein the verification request to the information processing apparatus is an access request to a register included in the one information processing apparatus.

10. The information processing apparatus according to claim 7, wherein the verification request to the information processing apparatus is an access request to the first memory.

11. The information processing apparatus according to claim 7, wherein the write request to the second memory included in each of the one or more information processing apparatuses is a request without a completion response.

12. A method of controlling an information processing system comprising:
generating, by a processor included in one information processing apparatus among a plurality of information processing apparatuses coupled with each other via a ring bus corresponding to a closed-loop bus, a verification request that is used for verification of completion of a write request after issuing the write request to a second memory included in each of one or more information processing apparatuses which are included in the plurality of information processing apparatuses and are other than the one information processing apparatus;
transmitting the verification request to a subsequent information processing apparatus included in the plurality of information processing apparatuses and subsequent to the one information processing apparatus;
transmitting, when a request from a preceding information processing apparatus included in the plurality of information processing apparatuses and preceding the one information processing apparatus among the plurality of information processing apparatuses is not a verification request, the request to the subsequent information processing apparatus;

transmitting, when the request is a verification request to another information processing apparatus included in the plurality of information processing apparatuses, the verification request and a request to a first memory included in the one information apparatus to the subsequent information processing apparatus in order of receiving; and executing, when the request is a verification request to the one information processing apparatus, processing in accordance with the verification request and generate a response of completion of the processing.

13. The method according to claim 12, further comprising:

arbitrating, by an arbitrating circuit included in the one information apparatus, between the verification request and the request to the first memory and output the verification request and the request in order of receiving;

transferring, when a request output from the arbitrating circuit is the verification request, the request output from the arbitrating circuit to the subsequent information processing apparatus;

transferring, when the request received from the preceding information processing apparatus is the verification request to the another information processing apparatus or the request to the first memory, the request received from the previous information processing apparatus to the arbitrating circuit; and executing, when the request received from the preceding information processing apparatus is the verification request to the one information processing apparatus, processing in accordance with the verification request.

14. The method according to claim 12, wherein the verification request to the one information processing apparatus is an access request to a register included in the one information processing apparatus.

15. The method according to claim 12, wherein the verification request to the one information processing apparatus is an access request to the first memory.

* * * * *